US012437102B2

(12) United States Patent
Blunt et al.

(10) Patent No.: US 12,437,102 B2
(45) Date of Patent: Oct. 7, 2025

(54) SECURE SHARING OF PERSONAL DATA IN DISTRIBUTED COMPUTING ZONES

(71) Applicant: International Business Machines Corporation, Armonk, NY (US)

(72) Inventors: Leonard William Blunt, Singapore (SG); Kishore Sethumadhavan, Punggol (SG); Anju Mehta, New Delhi (IN); Jimitkumar Parshuram Raval, Hedges Park (SG)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 17/456,957

(22) Filed: Nov. 30, 2021

(65) Prior Publication Data

US 2023/0169204 A1 Jun. 1, 2023

(51) Int. Cl.
*G06F 21/31* (2013.01)
*G06F 21/60* (2013.01)
*G06F 21/62* (2013.01)

(52) U.S. Cl.
CPC .......... *G06F 21/6245* (2013.01); *G06F 21/31* (2013.01); *G06F 21/602* (2013.01); *G06F 21/606* (2013.01)

(58) Field of Classification Search
CPC .... G06F 21/6245; G06F 21/31; G06F 21/602; G06F 21/606
USPC .......................................................... 726/26
See application file for complete search history.

(56) References Cited

U.S. PATENT DOCUMENTS

| 8,671,455 | B1* | 3/2014 | Zhu ....................... G06F 21/554 |
| | | | 726/26 |
| 8,914,342 | B2* | 12/2014 | Kalaboukis ............. H04L 67/10 |
| | | | 707/754 |
| 9,853,959 | B1* | 12/2017 | Kapczynski ............ H04L 63/08 |
| 10,114,960 | B1* | 10/2018 | McClintock ........ H04L 63/1408 |
| 10,437,811 | B1 | 10/2019 | Sutton |
| 11,354,424 | B2* | 6/2022 | Sun ....................... G06F 21/602 |
| 11,640,449 | B2* | 5/2023 | Groth ..................... G06Q 50/18 |
| | | | 726/26 |
| 11,720,709 | B1* | 8/2023 | Kalaboukis ........... G06F 3/0482 |
| | | | 726/26 |

(Continued)

FOREIGN PATENT DOCUMENTS

| GB | 2573470 B | 4/2020 |
| JP | 2016046799 A | 4/2016 |

(Continued)

OTHER PUBLICATIONS

"Method for Securing and Sharing Personal Information", An IP.com Prior Art Database Technical Disclosure, IP.com No. IPCOM000187529D, IP.com Electronic Publication Date: Sep. 10, 2009, 3 pages.

(Continued)

*Primary Examiner* — Thanh T Le
(74) *Attorney, Agent, or Firm* — Kimberly Zillig

(57) ABSTRACT

A method, computer program product and computer system to securely share personal data is provided. A processor receives a request to initiate a personal data share between a user and a third-party. A processor retrieves a module from a repository. A processor executes the module in an isolated workload of a distributed computing platform. A processor sends the personal data share to the third party.

20 Claims, 7 Drawing Sheets

(56) References Cited

U.S. PATENT DOCUMENTS

| | | | |
|---|---|---|---|
| 11,734,450 B1* | 8/2023 | Fedele | G06F 21/6254 |
| | | | 726/28 |
| 11,941,156 B1* | 3/2024 | Kats | G06F 21/6263 |
| 2004/0088295 A1* | 5/2004 | Glazer | G06Q 30/02 |
| | | | 707/999.009 |
| 2005/0114672 A1* | 5/2005 | Duncan | G06F 21/10 |
| | | | 713/182 |
| 2006/0212713 A1* | 9/2006 | Hatakeda | G06F 21/6245 |
| | | | 713/182 |
| 2010/0077489 A1 | 3/2010 | Ake | |
| 2012/0005720 A1* | 1/2012 | McGloin | G06F 21/6263 |
| | | | 726/1 |
| 2013/0067032 A1 | 3/2013 | Kasim | |
| 2013/0332987 A1* | 12/2013 | Tenneti | H04L 63/10 |
| | | | 726/4 |
| 2014/0215638 A1 | 7/2014 | Nicolas | |
| 2015/0047003 A1* | 2/2015 | Khan | H04L 63/08 |
| | | | 726/7 |
| 2015/0135261 A1* | 5/2015 | Park | H04L 63/102 |
| | | | 726/4 |
| 2015/0317490 A1* | 11/2015 | Carey | G16B 20/00 |
| | | | 726/26 |
| 2016/0078239 A1* | 3/2016 | Beiter | G06F 21/6209 |
| | | | 713/164 |
| 2016/0098576 A1 | 4/2016 | Allen | |
| 2016/0224651 A1 | 8/2016 | Kumarasamy | |
| 2017/0140171 A1* | 5/2017 | Antonelli | G06F 21/6272 |
| 2017/0169249 A1 | 6/2017 | De Oliveira | |
| 2018/0373882 A1* | 12/2018 | Veugen | H04L 9/0869 |
| 2019/0319932 A1* | 10/2019 | Kandregula | H04L 67/306 |
| 2019/0340376 A1 | 11/2019 | Fleck | |
| 2019/0342390 A1 | 11/2019 | Mihnea-Marian | |
| 2021/0021577 A1* | 1/2021 | Sazonov | H04L 63/0428 |
| 2021/0081565 A1* | 3/2021 | Sakamoto | G06F 21/6245 |
| 2021/0141913 A1* | 5/2021 | Mosconi | G06F 21/629 |
| 2021/0192651 A1* | 6/2021 | Groth | G06N 20/20 |
| 2022/0172183 A1* | 6/2022 | Wong | G06Q 20/12 |
| 2022/0207179 A1* | 6/2022 | Karlsen | G06F 21/78 |
| 2022/0229918 A1* | 7/2022 | Pottier | G06F 21/602 |
| 2022/0318420 A1* | 10/2022 | Marino | G06F 21/53 |
| 2022/0358208 A1* | 11/2022 | Vijayrao | G06F 3/0637 |
| 2022/0394061 A1* | 12/2022 | Aslam | H04L 63/1425 |

FOREIGN PATENT DOCUMENTS

| | | |
|---|---|---|
| JP | 2019532368 A | 11/2019 |
| JP | 2019532418 A | 11/2019 |

OTHER PUBLICATIONS

Barrett, Brian, "Hack Brief: An Astonishing 773 Million Records Exposed in Monster Breach", Security, 01.16.2019, Wired, 4 pages.

Disclosed Anonymously, "Method and System for Utilizing Block Chain to Share Consumer Needs with Trusted Vendors", An IP.com Prior Art Database Technical Disclosure, IP.com No. IPCOM000252828D, IP.com Electronic Publication Date: Feb. 14, 2018, 4 pages.

Flitter et al., "Capital One Data Breach Compromises Data of Over 100 Million", The New York Times, Jul. 29, 2019, 3 pages.

Leonhardt, Megan, "The 5 biggest data hacks of 2019", Published Dec. 17, 2019, 7 pages, <https://www.cnbc.com/2019/12/17/the-5-biggest-data-hacks-of-2019.html>.

Lyons, Kim, "Zynga password breach affected 170 million accounts", The Verge, Dec. 19, 2019, 2 pages.

Mell et al., "The NIST Definition of Cloud Computing", National Institute of Standards and Technology, U.S. Department of Commerce, Special Publication 800-145, Sep. 2011, 7 pages.

Williams, Chris, "620 million accounts stolen from 16 hacked websites now for sale on dark web, seller boards", The Register, Feb. 11, 2019, 14 pages.

\* cited by examiner

SECURE SHARING OF PERSONAL DATA IN DISTRIBUTED COMPUTING ZONES

BACKGROUND OF THE INVENTION

The present invention relates generally to the field of data security, and more particularly to creating a runtime environment for monitoring the access to personal data.

Personal data can take many different forms and can potentially be misused if shared inappropriately. One type of personal data is financial account data such as bank account or credit card numbers, which could potentially be used to perpetrate fraudulent financial transactions if this data falls into the wrong hands. Another type of personal data is personally identifiable information (PII), which is any kind of data that could potentially be used to identify a specific individual. PII could be used to engage in unlawful activities such as identity theft.

SUMMARY

Embodiments of the present invention provide a method, system, and program product to securely share personal data. A processor receives a request to initiate a personal data share between a user and a third-party. A processor retrieves a module from a repository. A processor executes the module in an isolated workload of a distributed computing platform. A processor sends the personal data share to the third party.

DETAILED DESCRIPTION

Figure 1:
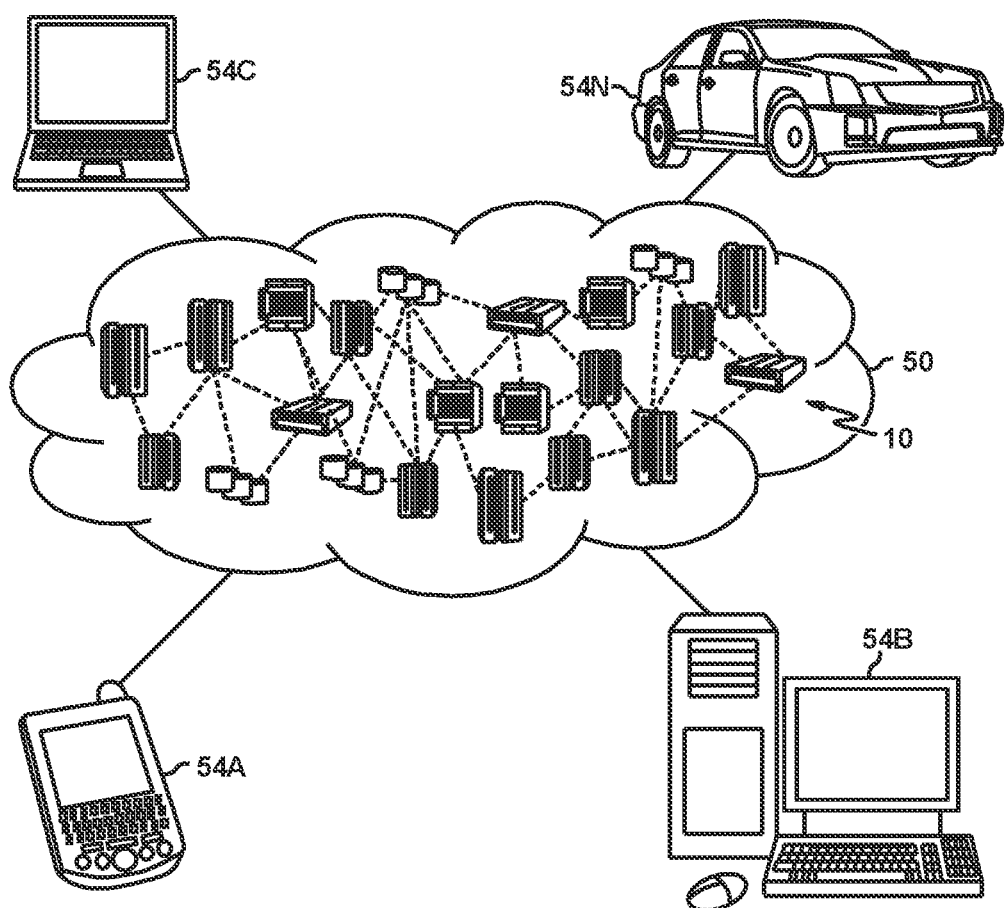
FIG. 1 depicts a cloud computing environment according to an embodiment of the present invention.

While solutions to data sharing of personal data with third parties are known, they often leave little to no choice in what type of data is shared and when it is shared. By utilizing personal zones in a distributed computing environment that can retrieve secure modules for data sharing with specific third parties, embodiments of the present invention provide a mechanism for users to securely share personal data with third parties as well as adjust each modules permission to permit a user more control of the data shared with said third party.

Embodiments of the present invention execute a specific application, code or script associated with the third party as a local module running in the controlled instance or zone within the distributed computing environment, allowing the local module access to the personal data contained within the zone. Additionally, embodiments of the present invention provide a user the ability to verify, monitor and control aspects of data sharing with the third party. As such, embodiments of the present invention provide improvements to prior solutions of data sharing by operating in a controlled computing environment in which data sharing can occur while stopping any potential leaks to unwanted parties.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
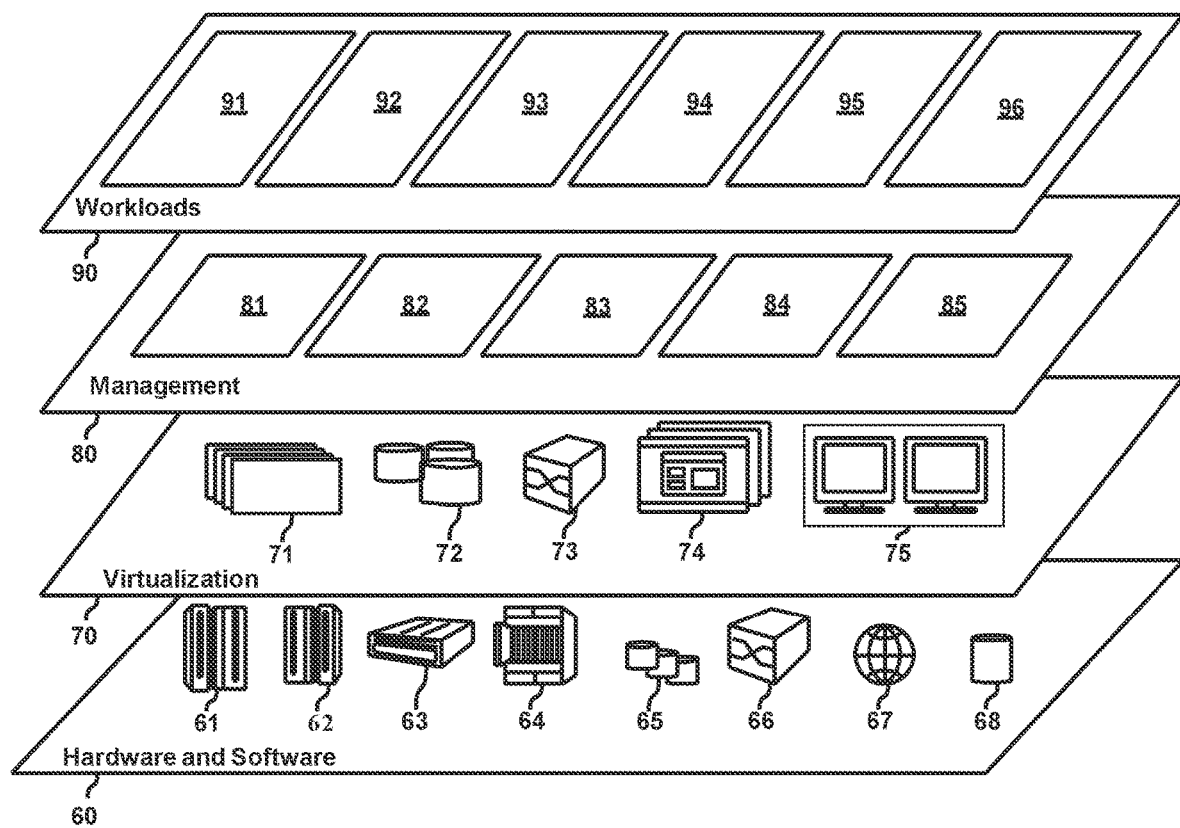
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Metering and Pricing 81 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 82 provides access to the cloud computing environment for consumers and system administrators. Service level management 83 provides cloud computing resource allocation and management such that required service levels are met. Service Level Agreement (SLA) planning and fulfillment 84 provide pre-arrangement for, and procurement of, cloud computing resources for which a future requirement is anticipated in accordance with an SLA. Resource provisioning 85 provides dynamic procurement of computing resources and other resources that are utilized to perform tasks within the cloud computing environment.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personal data sharing 96.

In various embodiments, personal data sharing 96 provides personal, isolated zones in a cloud computing environment that permit sharing of personal, private, or secure data between a user and a third party, such as a banking company or a government entity. As discussed herein, personal data sharing workload 96 permits an isolated session within cloud computing environment 50 that monitors and ensures the safe sharing and transmission of personal data between the user and a third party. One of ordinary skill in the art will understand that the features discussed herein may also be performed by any workload in workload layer 90 without deviating from the invention.

Figure 3:
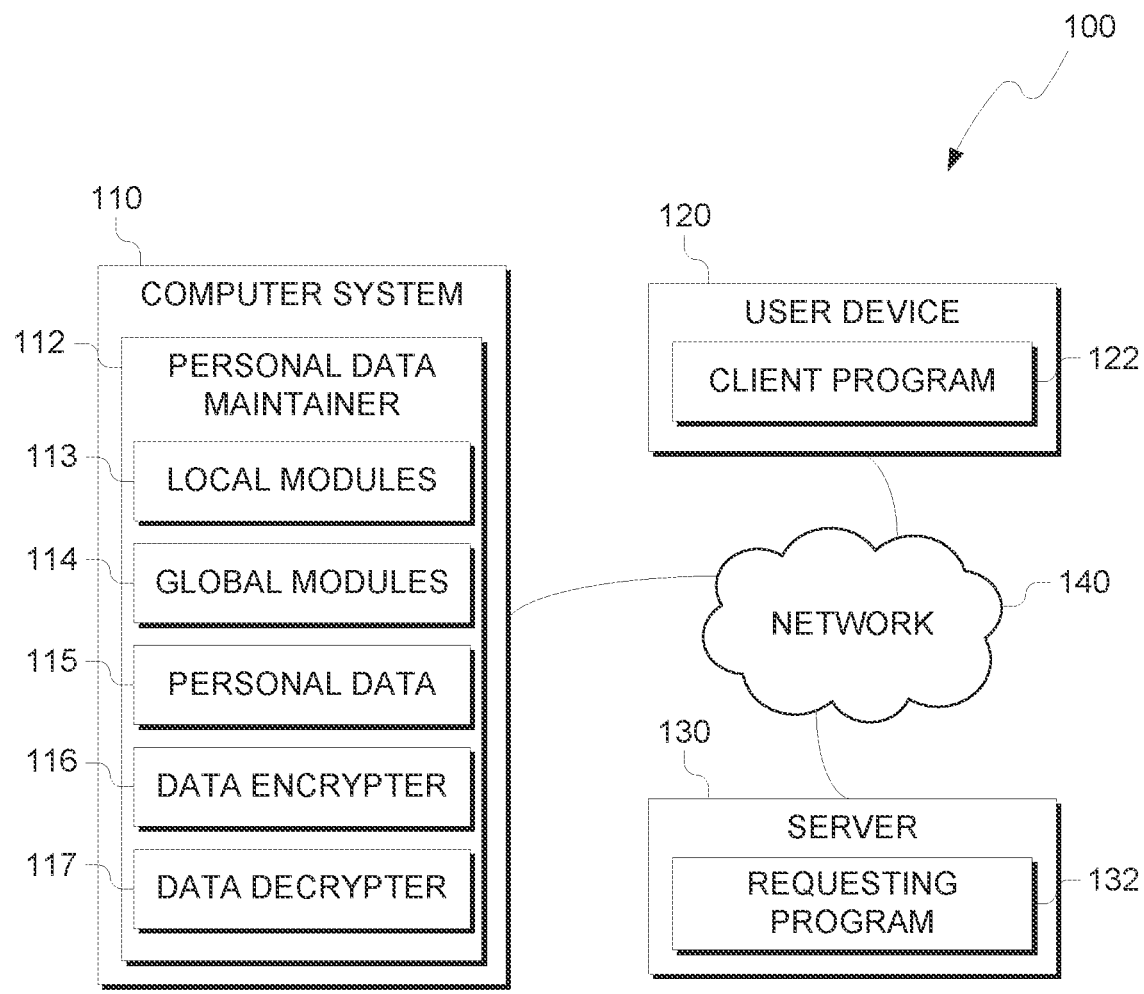
FIG. 3 illustrates a secured cloud zone environment environment for sharing personal data, in accordance with an embodiment of the present invention.

FIG. 3 is a functional block diagram illustrating secured cloud zone environment, generally designated 100, in accordance with one embodiment of the present invention. Secured cloud zone environment 100 includes computer system 110, user device 120 and server 130 connected over network 140. Computer system 110 includes personal data maintainer 112, local module 113, global module 114, personal data 115, data encrypter 116, and data decrypter 117. User device 120 includes client program 122. Server 130 includes requesting program 132.

In various embodiments of the present invention, computer system 110, user device 120 or server 130 are any computing device that can be a standalone device, a server, a laptop computer, a tablet computer, a netbook computer, a personal computer (PC), or a desktop computer. In another embodiment, computer system 110, user device 120 or server 130 represent a computing system utilizing clustered computers and components to act as a single pool of seamless resources, such as cloud computing environment 50. In general, computer system 110, user device 120 or server 130 can be any computing device or a combination of devices with access to local module 113, global module 114, personal data 115, data encrypter 116, or data decrypter 117 and is capable of executing personal data maintainer 112, client program 122, or requesting program 132. Computer system 110, user device 120 or server 130 may include internal and external hardware components, as depicted and described in further detail with respect to FIG. 5.

In this exemplary embodiment, personal data maintainer 112, local module 113, global module 114, personal data 115, data encrypter 116, and data decrypter 117 are stored on computer system 110. However, in other embodiments, personal data maintainer 112, local module 113, global module 114, personal data 115, data encrypter 116, and data decrypter 117 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between computer system 110, user device 120 and server 130, in accordance with a desired embodiment of the present invention.

In various embodiments, personal data maintainer 112 is an application that is an instanced workload in workloads layer 90 (i.e., personal data sharing workload 96). For each user, workloads layer 90 provisions personal data maintainer 112. Personal data maintainer 112 permits a third party module from local module 113 to access user data while executing within personal data maintainer 112 and ensures that the only prescribed data is accessed. Personal data maintainer 112, via the third party module, establishes a personal data share with a third party (i.e., the operator of server 130). In some third party modules, the user data is only accessed locally inside the Personal data maintainer 112 within a workload of cloud computing environment 50. However, some modules may permit personal data to be shared outside of the isolated zone of the workload, provided the user has given consent for data to be shared outside of personal data maintainer 112. For simplicity, both of these scenarios of local and remote sharing will be referred to as personal data share with the understanding that this sharing may exist solely within the personal data maintainer 112 and the third party module, or explicitly shared externally based on the modules data access definitions.

In some scenarios, server 130 deploys requesting program 132 which requests a personal data share with a user based on an action of the user. For example, a user accesses a website associated with the third party to start a loan application process. In response to starting the process, requesting program 132 sends a request to personal data maintainer 112 to initiate the personal data share. In other scenarios, the user initiates the personal data share with a third party. In such scenarios, the third party provides the user with a link, address or any other type of identifier to begin the establishment of the personal data share between the user and the third party.

In various embodiments, personal data 115 includes any personal information, such as PII, that a user may share with a third party, such as, but not limited to, names, addresses, government issued identification, medical history, salary, and the like. In some scenarios, personal data 115 includes any type of information that a user would like to share with a third party, but still limit access to or otherwise control via the personal data share, such as, but not limited to, browsing or shopping patterns.

Prior to establishment of the personal data share, personal data maintainer 112 retrieves one or more modules associated with the third party. Global modules 114 includes a repository of various modules from a variety of third parties that utilize the personal data share provided by cloud computing environment 50. Each module includes code, scripts or instructions required to access the data while running in the personal data maintainer 112 or establish an external data share between the user and the third party. For example, a module for personal data share with a bank would include scripting to retrieve specific types of personal data 115, such as work/salary history and credit score. As discussed herein, modules may permit a selective sharing of data decided by the user. In such scenarios, global modules 114 include indications of essential and non-essential data for establishing a personal data share with a user. For non-essential personal data, a user may selectively choose to share such information with the third party.

In other scenarios, global modules 114 may also include a predetermined or adjustable validity period for each data share with a user. For example, a user and third party initiate a data share which lasts for a year. Based on the global module including scripting or coding to indicate the validity period, personal data maintainer 112 revokes the personal data share when the validity period ends. In various scenarios, personal data maintainer 112 permits the user to revoke any data share whether within the isolated personal data maintainer 112 or externally sharing with a third party.

In various embodiments, when a user or third party initiates a data share with the other participant, personal data maintainer 112 retrieves the global module for the third party, and the type of data share if the third party has multiple modules associated with the third party (e.g., a bank may have different modules for car loans, house loans and credit card applications). Personal data maintainer 112 creates a specific instance of the retrieved global module for the user in local modules 113. Local module 113 includes any instanced modules that represent each data share established for a user. Local module 113 includes the type of information shared (i.e., essential and non-essential data for establishing a personal data share) as well as any other limitation to the personal data share such as a validity period for the share.

In various embodiments, client program 122 of user device 120 permits users to initiate data shares with third parties and to change the local module 113 based on the contents of each module (e.g., changing non-essential personal data 115 from being shared). In some scenarios, client program 122 may be a web browser. In such scenarios, computer system 110 provides web pages to client program 122 such that users can initiate and review any ongoing or previous data share with a third party. In other scenarios, client program 122 is a dedicated application (e.g., a mobile app) that provide the function discussed herein.

As a non-limiting example, personal data maintainer 112 has been provided a "loan application module" by a third party who operates as a bank or otherwise provides loans to customers. The loan application module defines the persona data 115 that is required to complete the loan application process. The module also defines a "pre-approval process" part of the overall "loan application process". Prior to providing the required personal data 115 to complete the "loan application process", the "pre-approval process" portion of the module defines that only certain personal data 115 needs to verified not shared, such as the jurisdiction (e.g., the state, province or country of residence for the user) or credit score of the user. In this pre-approval process, personal data maintainer 112 securely exchanges only the necessary personal data 115. In some scenarios, personal data maintainer 112 verifies user supplied information to the third party (e.g., the loan processor), as discussed further in regard to FIG. 6, without actually exchanging or otherwise providing personal data 115. If the third party and user proceed past the "pre-approval process", then a data share of the required personal data 115 is shared by personal data maintainer 112 with the third party.

In various embodiments, once a personal data share is established between the user and the third party, personal data maintainer 112 provides a reference key to the third party (i.e., requesting program 132). Either in response to receiving the reference key or at a later time, the third party establishes a secure and trusted connection with cloud computing environment 50 to retrieve personal data 115 based on the local module 113 associated with the reference key. This secure connection ensures that the personal data 115 sent to and retrieved by the third party is properly exchanged between trusted actors (i.e., the third party and the operator of cloud computing environment 50) with no intermediaries. In some instances, governmental compliance may require both documented and trusted transfer of personal data. Additionally, the trusted data share limits the need of the user to enter and potentially make public personal data 115. Personal data maintainer 112 also notifies the user (e.g., as a pop-up on a web browsing session or notification via a mobile app) that the personal data share has been established, so that the user may review any ongoing or previous data share with a third party.

In various embodiments, personal data 115 is encrypted for additional data security. In such scenarios, each instance of personal data maintainer 112 includes data encrypter 116 and data decrypter 117. Each user is assigned private and public keys in a paired-key encryption scheme. Personal data 115 is signed with the third parties public key via data encrypter 116, which is the decrypted by the third party via a private key associated with the third party. Similarly, the third party signs data with the user's public key (which may be included in the reference number given during data share establishment) when sending module updates or other messages to cloud computing environment 50. By performing data encryption on a workload level (e.g., within the user's zone), additional data security is realized by personal data maintainer 112 as other layers of cloud computing environment 50 can offer protection against untrusted actors.

Figure 4:
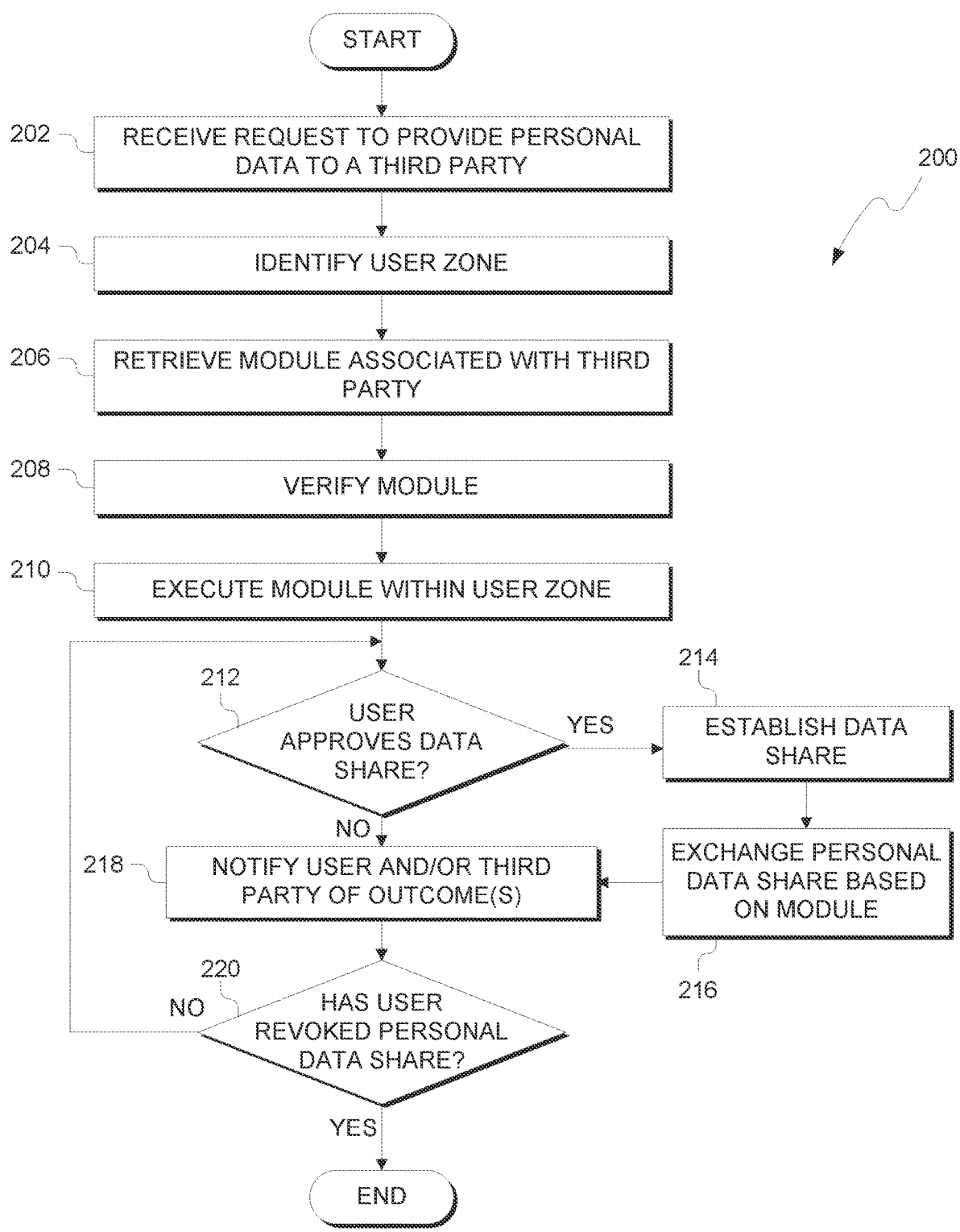
FIG. 4 illustrates operational processes of a personal data maintainer workload in a secured cloud zone environment environment, in accordance with an embodiment of the present invention.

FIG. 4. illustrates operational processes, generally designated 200, of workload instance of personal data maintainer 112. In process 202, personal data maintainer 112 receives a request to initiate a personal data share between a user and a third party. In some scenarios, based on actions made by user while interacting with the third party, requesting program 132, of server 130 operated by the third party, sends a request to personal data maintainer 112 to initiate a personal data share between the user and the third party. In other scenarios, the user, via client program 122, provides personal data maintainer 112 an indication of the third party whom with the user wishes to initiate a personal data share. In some embodiments, the request received in process 202 also includes an indication of or reference to which module of global modules 114 should be used to initiate the personal data share.

In process 204, personal data maintainer 112 identifies the user zone in cloud computing environment 50 the user's personal data 115 is maintained. For scenarios where a user initiates the data share, personal data maintainer 112 retrieves login information from client program 122. In scenarios where the third party initiates the data share, the third party also includes in the request an identifier associated with the user to identify which zone personal data 115 pertaining to the user resides. In process 206, personal data maintainer 112 retrieves any modules from global modules 114 needed to initiate the personal data share. Global modules 114 include code or scripts which instruct personal data maintainer 112 on what personal data 115 is to be collected (both essential and nonessential data being indicated), the validity period of the personal data share (i.e., the length of time that the personal data share will share personal data 115), public keys of third parties for encryption, as well as any other metadata or indicators to determine the type of module or owner of the module.

In process 208, personal data maintainer 112 verifies the module prior to loading the module into the user's local modules 113. In order to ensure the modules share data properly, personal data maintainer 112 verifies each module to ensure proper access is used by the module and that any provided public encryption keys are up to date. In process 210, personal data maintainer 112 executes the local modules 113 retrieved in process 206 from global modules 114. Based on the code or script contained within, the executed local modules 113 established the type of personal data 115 that will be shared as well as the length of time the data share will be valid. Furthermore, since the local modules 113 are executed in workloads layer 90 of cloud computing environment 50 additional security and computational power can be implemented to better protect from personal data 115 from being incorrectly shared with non-intended parties.

In decision process 212, personal data maintainer 112 determines if the user has authorized or otherwise approved sharing personal data with a third party. In some scenarios, a third party provides the user with a link or other type of referral that indicates to personal data maintainer 112 that the data share is approved. In other scenarios, a user may access a dashboard or other interface provided by personal data maintainer 112 to approve any pending data shares. If the user does not permit the data share (NO branch of decision process 212), then personal data maintainer 112 notifies the third party and the user that no data sharing will occur (process 218). If the user approves the data share (YES branch of decision process 212), then personal data maintainer 112 establishes a data share per the module's definitions and code (process 214).

In process 216, personal data maintainer 112 exchanges personal data 115 based on the module's definitions and code. In some scenarios, personal data maintainer 112 may perform a verification operation which verifies, but does not provide personal data, sharing only in the personal data 115 is correct. In other scenarios, the data share may be a one-time transfer or may include an ongoing sharing operation at predetermined intervals (e.g., providing a monthly credit score). Once the data share is established, personal data maintainer 112 notifies both the user and the third party of the data share (process 218). Additionally, personal data maintainer 112 may also notify users and third parties of any ongoing data shares when the transfer of data occurs (e.g., the user is notified every month when a credit scores is shared with a bank).

In process 212, personal data maintainer 112 notifies the user and the third party that the personal data share is established. For the user, personal data maintainer 112 sends a notification or other message to client program 122 to let the user know of the new personal data share with the third party. For the third party, personal data maintainer 112 sends a reference key to the third party for future use in retrieving the personal data 115 based on the local module the reference key is derived from. During this process, a user may revoke or otherwise alter the local module's personal data share. In decision process 220, if a user revokes the personal data share (YES branch of decision process 220), then personal data maintainer 112 ends the personal data share between the third party and user's personal data 115. Otherwise (NO branch of decision process 220), personal data maintainer 112 maintains the personal data share for the validity period indicated in local modules 113. In some scenarios, a user may alter the personal data share, while keeping the persona data share active. For example, a user may later alter a local module 113 by changing non-essential data being shared. Additionally, a user may extend or shorten the validity period during any active personal data share.

Figure 5:
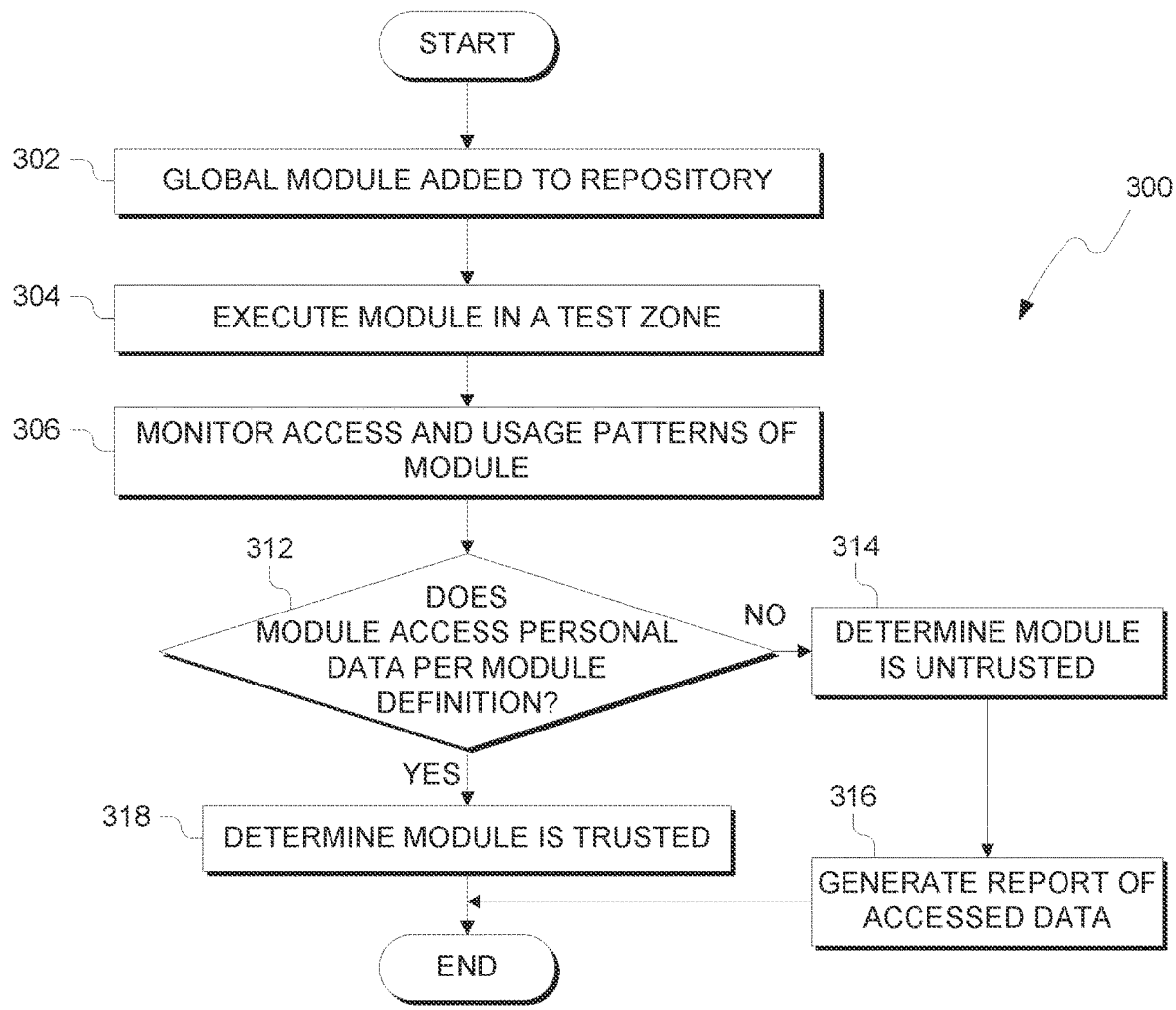
FIG. 5 illustrates operational processes of a personal data maintainer verifying third party modules, in accordance with an embodiment of the present invention.

FIG. 5 illustrates operational processes, generally designated 300, of personal data maintainer 112 verifying third party modules. In process 302, personal data maintainer 112 receives a global module from a third party, storing the module in global modules 114. As discussed herein, a third party may have multiple modules based in the types of tasks or functions the third party would like to support. In process 304, personal data maintainer 112 executes the newly added module in a test zone. The test zone is similar to that of a user zone, complete with personal data 115, however personal data 115 is not that of any particular user. During execution, personal data maintainer 112 monitors access and usages patterns of the module (process 306).

Based on the monitored behavior of the module, personal data maintainer 112 determines if a module accesses data not defined by the module (decision process 312). As discussed herein, each module includes one or more definition statements that identify that personal data 115 that will be accessed. If the module accesses the data per the module's definition (YES branch of decision process 312), then personal data maintainer 112 determines the module is trusted (process 318). As such, personal data maintainer 112 will deploy the global module as a local module when evoked by a user. If the module improperly accesses the personal data 115 in the test zone (NO branch of decision process 312), then personal data maintainer 112 determines the module is untrusted (process 314). In process 316, personal data maintainer 112 generates a report detailing the improper access, the test zone's personal data 115 that was improperly accessed, and the details of the third party (e.g., business names, web domains, and other identifying information).

Figure 6:
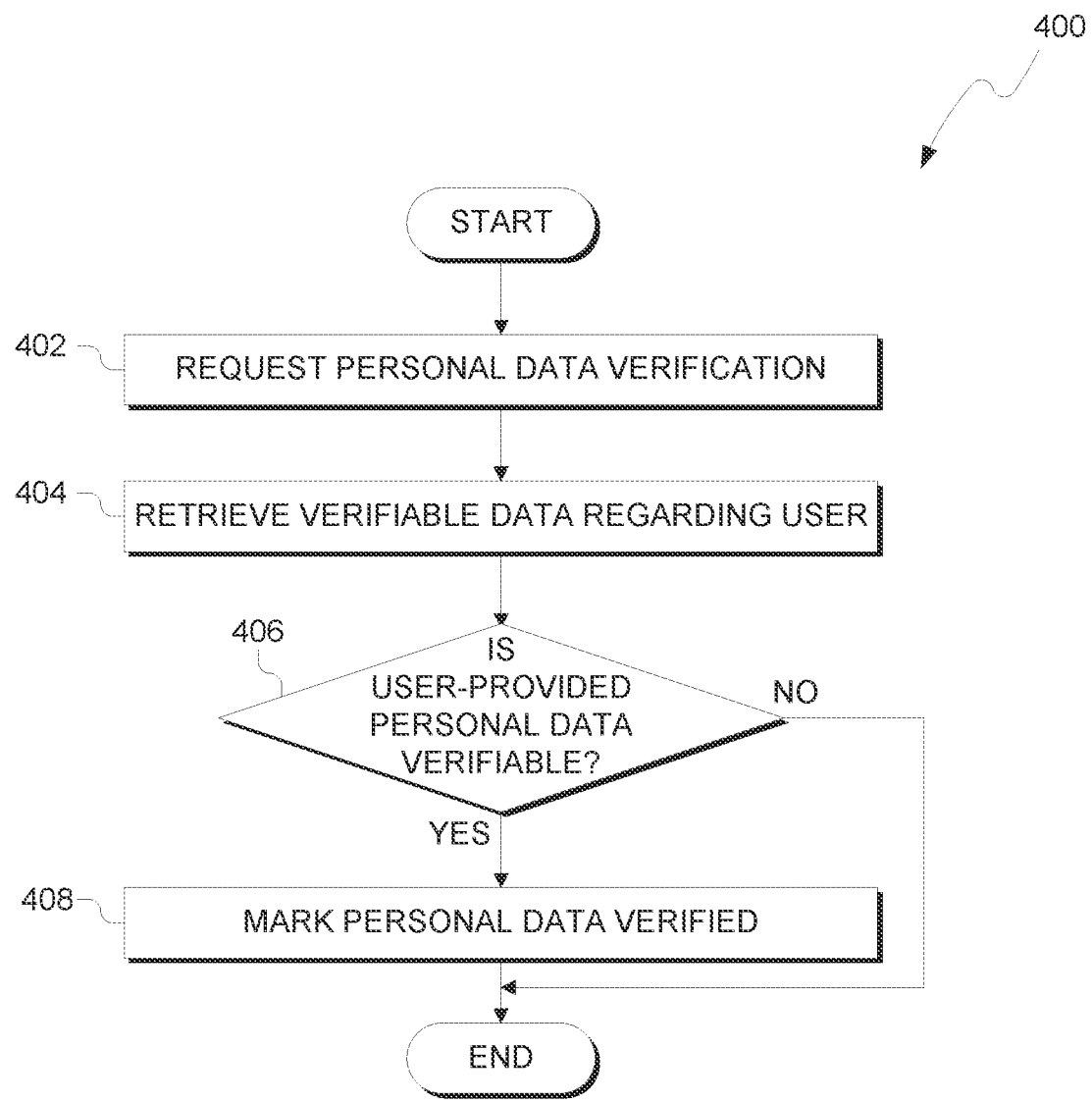
FIG. 6 illustrates operational processes of a personal data maintainer verifying personal data of a user, in accordance with an embodiment of the present invention.

FIG. 6 illustrates operational processes, generally designated 400, of personal data maintainer 112 verifying personal data of a user. As discussed herein, some modules may be used only to verify personal data 115 to a third party without exchanging the personal data 115 to the third party. In such embodiments, the present invention provides a secure methods, systems and apparatuses to verify user-provided data to a third party without personal data 115 leaving the user's zone in cloud computing environment 50. In process 402, personal data maintainer 112 receives, from a third party, a request to verify personal data 115 for a user. The third party, in another channel of communication (e.g., the third party's web site), receives some of the user's personal data. In process 402, the third party includes in the request a hash derived from the personal data that was collected by the third party. Also, in process 402, the request also includes what data fields of personal data 115 are to be verified (e.g., name, address and date of birth), but not the actual values provided by the user such that the hash of the values is only provided and included in the request.

In process 404, personal data maintainer 112 retrieves the requested personal data 115 to be verified. In decision process 406, personal data maintainer 112 is the retrieved personal data 115 from process 404 is verifiable based on the received hash in process 402. Personal data maintainer 112 generates a hash from the user zone's personal data for the data fields indicated in the request. If the hash values match (YES branch of decision process 406), then personal data maintainer 112 marks the personal data verified and notifies the third party the user-provided data to the third party is valid and correct (process 408). If the hash values do not match then (NO branch of decision process 406), then personal data maintainer 112 end the verification process.

Figure 7:
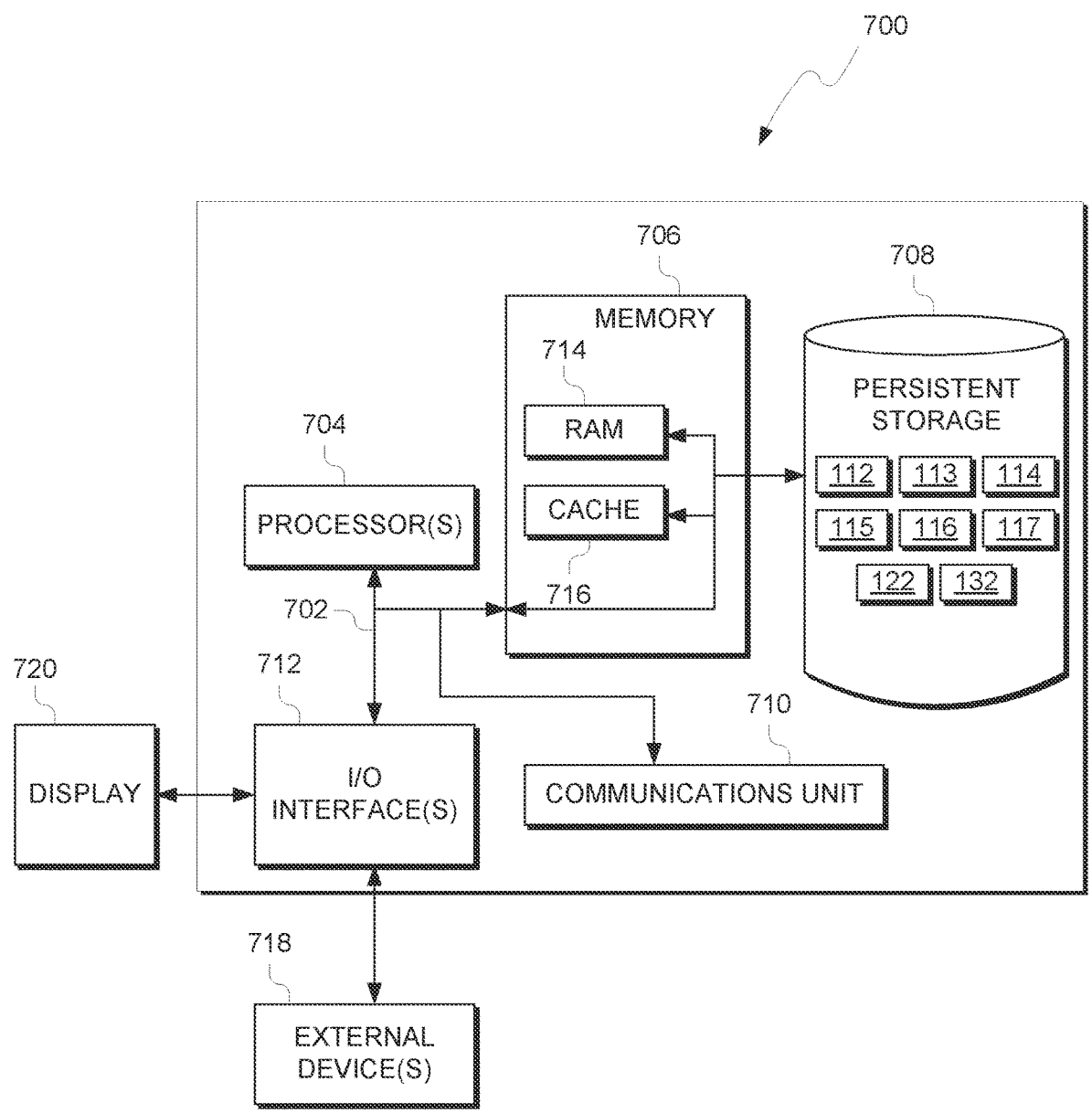
FIG. 7 depicts a block diagram of components of the computing device executing a personal data maintainer workload, in accordance with an exemplary embodiment of the present invention.

FIG. 7 depicts a block diagram of components of a computing device 700, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 700 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Personal data maintainer 112, local module 113, global module 114, personal data 115, data encrypter 116, data decrypter 117, client program 122 and requesting program 132 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 140. In these examples, communications unit 710 includes one or more network interface cards. Communications unit 710 may provide communications through the use of either or both physical and wireless communications links. Personal data maintainer 112, local module 113, global module 114, personal data 115, data encrypter 116, data decrypter 117, client program 122 and requesting program 132 may be downloaded to persistent storage 708 through communications unit 710.

I/O interface(s) 712 allows for input and output of data with other devices that may be connected to computing device 700. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., personal data maintainer 112, local module 113, global module 114, personal data 115, data encrypter 116, data decrypter 117, client program 122 and requesting program 132, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
    receiving, by one or more processors, a request to initiate a personal data share between a user and a third-party;
    identifying, by the one or more processors, the third-party with whom the user wishes to initiate the personal data share;
    identifying, by the one or more processors, in the request, a module used to initiate the personal data share;
    identifying, by the one or more processors, an identifier associated with the user to identify an isolated zone in which a user's personal data resides;
    retrieving, by one or more processors, the module from a repository;
    verifying, by the one or more processors, the module prior to loading the module into a user's local module;
    executing, by the one or more processors, the module in the isolated zone;
    obtaining approval of the user, by the one or more processors, for the personal data share;
    sending, by the one or more processors, the personal data share to the third-party;
    indicating a validity period, by the one or more processors, for the personal data share; and
    revoking the personal data share, by the one or more processors, when the validity period ends.

2. The method of claim 1, wherein the module from the repository includes definitions regarding which components of the user's personal data to be included in the personal data share with the third-party.

3. The method of claim 2, the method further comprising:
    executing, by the one or more processors, the module in a test workload of the distributed computing platform;
    monitoring, by the one or more processors, accessed data by the module during the executing of the module; and
    in response to the accessed data by the module including data not indicated by the definitions in the module, determining, by the one or more processors, that the module is untrusted.

4. The method of claim 2, wherein sending the personal data share to the third-party includes providing verification of the user's personal data.

5. The method of claim 4, the method further comprising:
    receiving from the third-party, by the one or more processors, a verification hash message, wherein the verification hash message is based on information collected from the third-party and provided by the user to the third-party.

6. The method of claim 5, the method further comprising:
    generating, by the one or more processors, a user data hash message based, in part, on the user's personal data;
    verifying, by the one or more processors, the verification hash message based on a comparison with the user data hash message; and
    sending to the third-party, by the one or more processors, a verification approved message.

7. The method of claim 1, wherein the third-party provides a plurality of modules associated with different types of data share scenarios.

8. A computer program product comprising:
    one or more computer-readable storage media and program instructions stored on the one or more computer-readable storage media, the program instructions comprising:
        program instructions to receive a request to initiate a personal data share between a user and a third-party;
        program instructions to identify the third-party with whom the user wishes to initiate the personal data share;
        program instructions to identify, in the request, a module used to initiate the personal data share;
        program instructions to identify an identifier associated with the user to identify an isolated zone in which a user's personal data resides;
        program instructions to retrieve the module from a repository;
        program instructions to verify the module prior to loading the module into a user's local module;
        program instructions to execute the module in the isolated zone;
        program instructions to obtain approval of the user for the personal data share;
        program instructions to send the personal data share to the third-party;
        program instructions to indicate a validity period for the personal data share; and
        program instructions to revoke the personal data share when the validity period ends.

9. The computer program product of claim 8, wherein the module from the repository includes definitions regarding which components of the user's personal data to be included in the personal data share with the third-party.

10. The computer program product of claim 9, the program instructions further comprising:
    program instructions to execute the module in a test workload of the distributed computing platform;
    program instructions to monitor accessed data by the module during the executing of the module; and program instructions to, in response to the accessed data by the module including data not indicated by the definitions in the module, determine that the module is untrusted.

11. The computer program product of claim 9, wherein sending the personal data share to the third-party includes providing verification of the user's personal data.

12. The computer program product of claim 11, the program instructions further comprising:
program instructions to receive from the third-party a verification hash message, wherein the verification hash message is based on information collected from the third-party and provided by the user to the third-party.

13. The computer program product of claim 12, the program instructions further comprising:
program instructions to generate a user data hash message based, in part, on the user's personal data;
program instructions to verify the verification hash message based on a comparison with the user data hash message; and
program instructions to send to the third-party a verification approved message.

14. The computer program product of claim 8, wherein the third-party provides a plurality of modules associated with different types of data share scenarios.

15. A computer system comprising:
one or more computer processors;
one or more computer readable storage media; and
program instructions stored on the one or more computer readable storage media for execution by at least one of the one or more computer processors, the program instructions comprising:
program instructions to receive a request to initiate a personal data share between a user and a third-party;
program instructions to identify the third-party with whom the user wishes to initiate the personal data share;
program instructions to identify, in the request, a module used to initiate the personal data share;
program instructions to identify an identifier associated with the user to identify an isolated zone in which a user's personal data resides;
program instructions to retrieve the module from a repository;
program instructions to verify the module prior to loading the module into a user's local module;
program instructions to execute the module in the isolated zone;
program instructions to obtain approval of the user for the personal data share;
program instructions to send the personal data share to the third-party;
program instructions to indicate a validity period for the personal data share; and
program instructions to revoke the personal data share when the validity period ends.

16. The computer system of claim 15, wherein the module from the repository includes definitions regarding which components of the user's personal data to be included in the personal data share with the third-party.

17. The computer system of claim 16, the program instructions further comprising:
program instructions to execute the module in a test workload of the distributed computing platform;
program instructions to monitor accessed data by the module during the execution of the module; and
program instructions to, in response to the accessed data by the module including data not indicated by the definitions in the module, determine that the module is untrusted.

18. The computer system of claim 16, wherein sending the personal data share to the third-party includes providing verification of the user's personal data.

19. The computer system of claim 18, the program instructions further comprising:
program instructions to receive from the third-party a verification hash message, wherein the verification hash message is based on information collected from the third-party and provided by the user to the third-party.

20. The computer system of claim 19, the program instructions further comprising:
program instructions to generate a user data hash message based, in part, on the user's personal data;
program instructions to verify the verification hash message based on a comparison with the user data hash message; and
program instructions to send to the third-party a verification approved message.

* * * * *